United States Patent
Burnham et al.

(10) Patent No.: US 10,337,628 B2
(45) Date of Patent: Jul. 2, 2019

(54) HIGH MASS FLOW CHECK VALVE ASPIRATOR

(71) Applicants: Matthew Burnham, Allen Park, MI (US); Andy Smith, Mishawaka, IN (US); Amy Backhus, Granger, IN (US)

(72) Inventors: Matthew Burnham, Allen Park, MI (US); Andy Smith, Mishawaka, IN (US); Amy Backhus, Granger, IN (US)

(73) Assignee: Nyloncraft Incorporated, Mishawaka, IN (US)

( * ) Notice: Subject to any disclaimer, the term of this patent is extended or adjusted under 35 U.S.C. 154(b) by 624 days.

(21) Appl. No.: 13/771,553

(22) Filed: Feb. 20, 2013

(65) Prior Publication Data
US 2013/0213510 A1   Aug. 22, 2013

Related U.S. Application Data

(60) Provisional application No. 61/600,880, filed on Feb. 20, 2012.

(51) Int. Cl.
*F16K 15/14* (2006.01)
*B60T 17/02* (2006.01)
*B60T 17/04* (2006.01)

(52) U.S. Cl.
CPC ............. *F16K 15/14* (2013.01); *B60T 17/02* (2013.01); *B60T 17/04* (2013.01); *Y10T 137/87587* (2015.04)

(58) Field of Classification Search
CPC .......... F16K 15/14; B60T 17/04; B60T 17/02; Y10T 137/87587

USPC .......... 137/113, 895, 115.11; 417/159, 188, 417/189, 191

See application file for complete search history.

(56) References Cited

U.S. PATENT DOCUMENTS

| | | | | |
|---|---|---|---|---|
| 3,276,468 A | * | 10/1966 | Lebow | B64D 37/00 137/115.11 |
| 3,543,783 A | * | 12/1970 | Ifield | F15B 13/022 137/101 |
| 3,635,601 A | * | 1/1972 | Larson et al. | 417/191 |
| 3,689,237 A | * | 9/1972 | Stark et al. | 48/190 |
| 3,946,562 A | * | 3/1976 | Ross | F15B 21/047 137/115.11 |
| 4,951,713 A | * | 8/1990 | Jordan et al. | 137/895 |
| 5,291,916 A | | 3/1994 | Kloosterman et al. | |
| 5,328,094 A | * | 7/1994 | Goetzke et al. | 239/88 |
| 5,622,203 A | * | 4/1997 | Giyler et al. | 137/337 |
| 6,035,881 A | | 3/2000 | Emmerich et al. | |
| RE37,090 E | | 3/2001 | Kloosterman et al. | |
| 6,220,271 B1 | | 4/2001 | Emmerich et al. | |
| 2011/0186151 A1 | * | 8/2011 | Sparazynski | 137/526 |

* cited by examiner

*Primary Examiner* — Craig M Schneider
*Assistant Examiner* — Christopher D Ballman
(74) *Attorney, Agent, or Firm* — Ice Miller LLP (57) ABSTRACT

A check valve aspirator is provided including a venturi pipe having a converging section with a converging inlet and a converging outlet, and a diverging section with a diverging inlet and a diverging outlet. The converging outlet is in fluid communication with the diverging inlet. An outlet channel is in fluid communication with the venturi pipe and has an outlet port. A ratio of a diameter of the converging section outlet to a diameter of the outlet port is less than 0.4.

20 Claims, 7 Drawing Sheets

PRIOR ART

HIGH MASS FLOW CHECK VALVE ASPIRATOR

CROSS-REFERENCE TO RELATED APPLICATIONS

The present application claims priority to U.S. Provisional Patent Application No. 61/600,880 filed Feb. 20, 2012 and titled "HIGH MASS FLOW CHECK VALVE ASPIRATOR", which is herein incorporated by reference in its entirety.

TECHNICAL FIELD OF THE DISCLOSED EMBODIMENTS

The present invention generally relates to check valves and, more particularly, to high mass flow check valve aspirators.

BACKGROUND OF THE DISCLOSED EMBODIMENTS

Internal combustion engines have long employed air flow conduits to provide vacuum assist for automobile subsystems, such as brakes; automatic transmissions and others. These systems often employed check valves located along the air flow conduit to prevent subsystem back pressure from reaching the engine, a typical check valve of this sort is described in U.S. Pat. No. 3,889,710.

These designs were improved upon with a check valve of the type disclosed in U.S. Pat. No. 5,291,916, which provided for a space-saving vacuum booster check valve located along a conduit between the air intake manifold and the brake booster. The check valve included three or more ports connected by hoses to the air intake, block, and one or more vehicle subsystems. Venturi tubes in the valve body connected the various ports to provide a vacuum booster effect to the subsystem. A common concave valve seat and diaphragm served to prevent back pressure from the subsystem from entering the main conduit between the air intake and the engine block.

While such designs work well, modern engine specifications often demand higher boosted vacuum flow and quicker vacuum recovery from the vacuum booster subsystems. The present invention is directed toward meeting these needs.

SUMMARY OF THE DISCLOSED EMBODIMENTS

The embodiments disclosed herein provide a check valve aspirator including a venturi pipe having a converging section with a converging inlet and a converging outlet, and a diverging section with a diverging inlet and a diverging outlet. The converging outlet is in fluid communication with the diverging inlet. An outlet channel is in fluid communication with the venturi pipe and has an outlet port. A ratio of a diameter of the converging section outlet to a diameter of the outlet port is less than 0.4. In one embodiment, the ratio of the diameter of the converging section outlet to the diameter of the outlet port is within a range of 0.3 to 0.35. In another embodiment, a ratio of the diameter of the converging section outlet to a diameter of the diverging section inlet is at least 0.8. In yet another embodiment, a ratio of a diameter of the converging section inlet to the diameter of the converging section outlet is less than 3.5. The ratio of the diameter of the converging section inlet to the diameter of the converging section outlet may be within a range of 1 to 3.2. Further, a ratio of a diameter of the diverging section inlet to a diameter of the diverging section outlet is within a range of 0.5 to 0.9. The check valve aspirator also includes a throat fluidly coupled between the converging section and the diverging section. A venturi check valve bowl is in fluid communication with the throat through a slot, wherein the slot has a width within a range of 1 mm to 3.5 mm and a length within a range of 3 mm to 6 mm. In yet another embodiment the venturi check valve bowl is in fluid communication with the throat through a diameter positioned within a range of 5 to 13 mm. A bypass check valve bowl is in fluid communication with the outlet channel. The bypass check valve bowl is positioned at least 20 mm downstream of the diverging outlet. More specifically, the bypass check valve bowl is positioned within a range of 20 mm to 45 mm downstream of the diverging outlet. A check valve is positioned within the check valve bowl. In some embodiments, the check valve includes a scalloped diaphragm.

BRIEF DESCRIPTION OF THE DRAWINGS

The present invention will become more fully understood from the detailed description and the accompanying drawings, wherein.

DETAILED DESCRIPTION OF THE VARIOUS EMBODIMENTS

For the purposes of promoting an understanding of the principles of the invention, reference will now be made to the embodiment illustrated in the drawings, and specific language will be used to describe that embodiment. It will nevertheless be understood that no limitation of the scope of the invention is intended. Alterations and modifications in the illustrated device, and further applications of the principles of the invention as illustrated therein, as would normally occur to one skilled in the art to which the invention relates are contemplated and desired to be protected. Such alternative embodiments require certain adaptations to the embodiments discussed herein that would be obvious to those skilled in the art.

Figure 1:
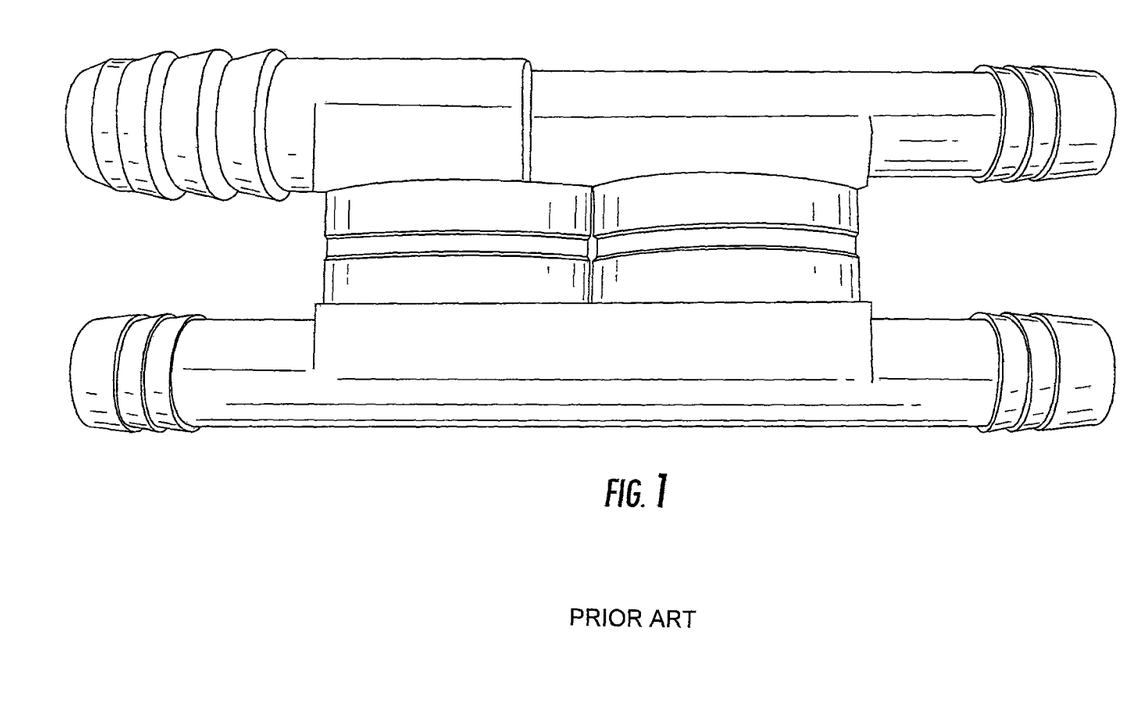
FIG. 1 illustrates a front view of prior art check valve aspirator.
Figure 2:
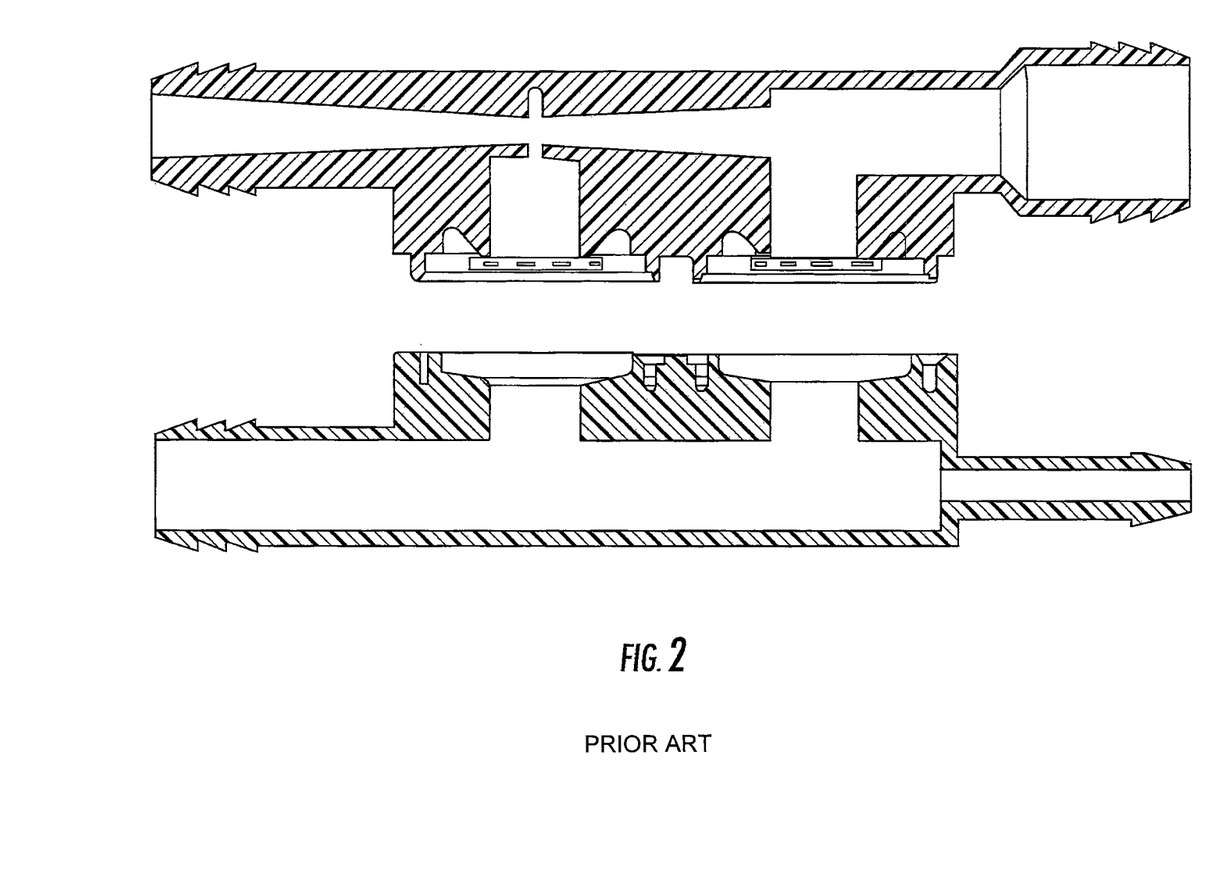
FIG. 2 illustrates a cross-sectional view of a prior art check valve aspirator.

A prior art check valve aspirator is illustrated in FIG. 1. The internal configuration and operation of the prior art aspirator of FIG. 1 is shown and described in U.S. Pat. No. 5,291,916. FIG. 2 is a reproduction of FIG. 2 from U.S. Pat. No. 5,291,916. The prior art check valve aspirator is commercially available from Nyloncraft Incorporated (616 W.

Figure 3:
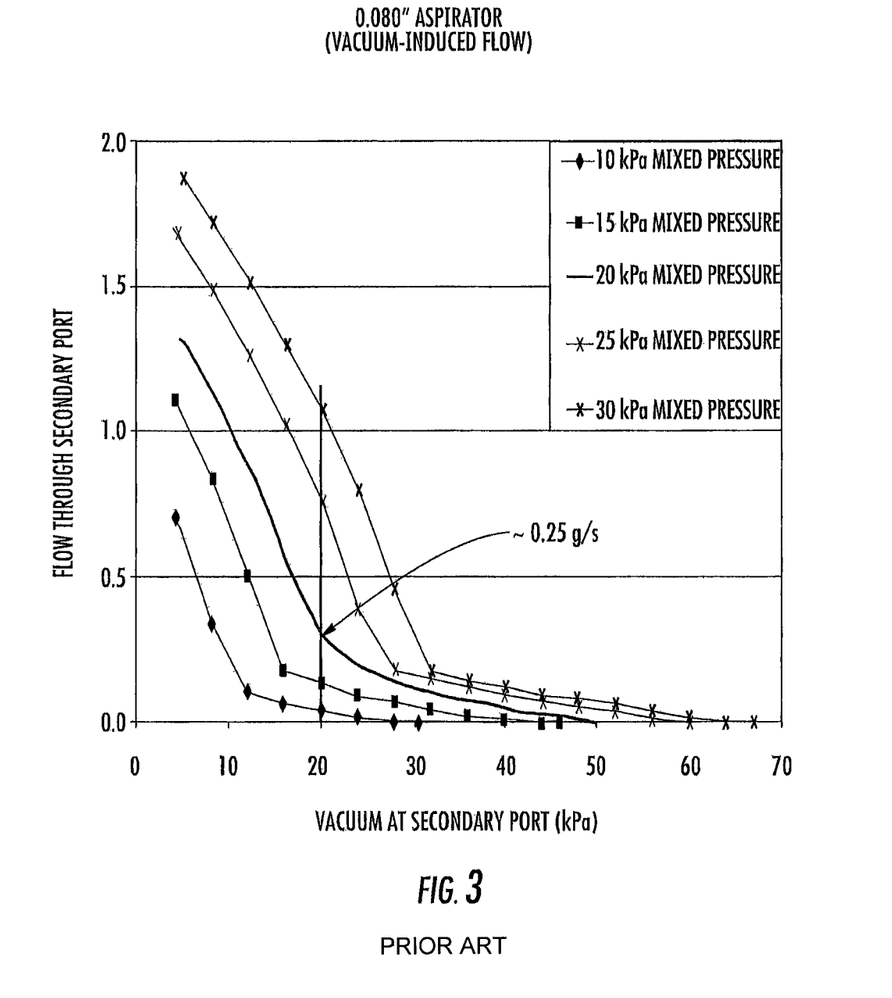
FIG. 3 illustrates test data showing flow through a secondary port versus vacuum at the secondary port when using a prior art check valve aspirator.

McKinley Ave, Mishawaka, Ind. 46545). The largest such commercially available check valve aspirator has a minimum venturi opening of 0.080" (2 mm). FIG. 3 illustrates test data showing flow through the secondary port versus vacuum at the secondary port. As can be seen in FIG. 3, with a 20 kPa vacuum source, the flow rate through the secondary port is approximately 0.25 g/s.

Figure 4:
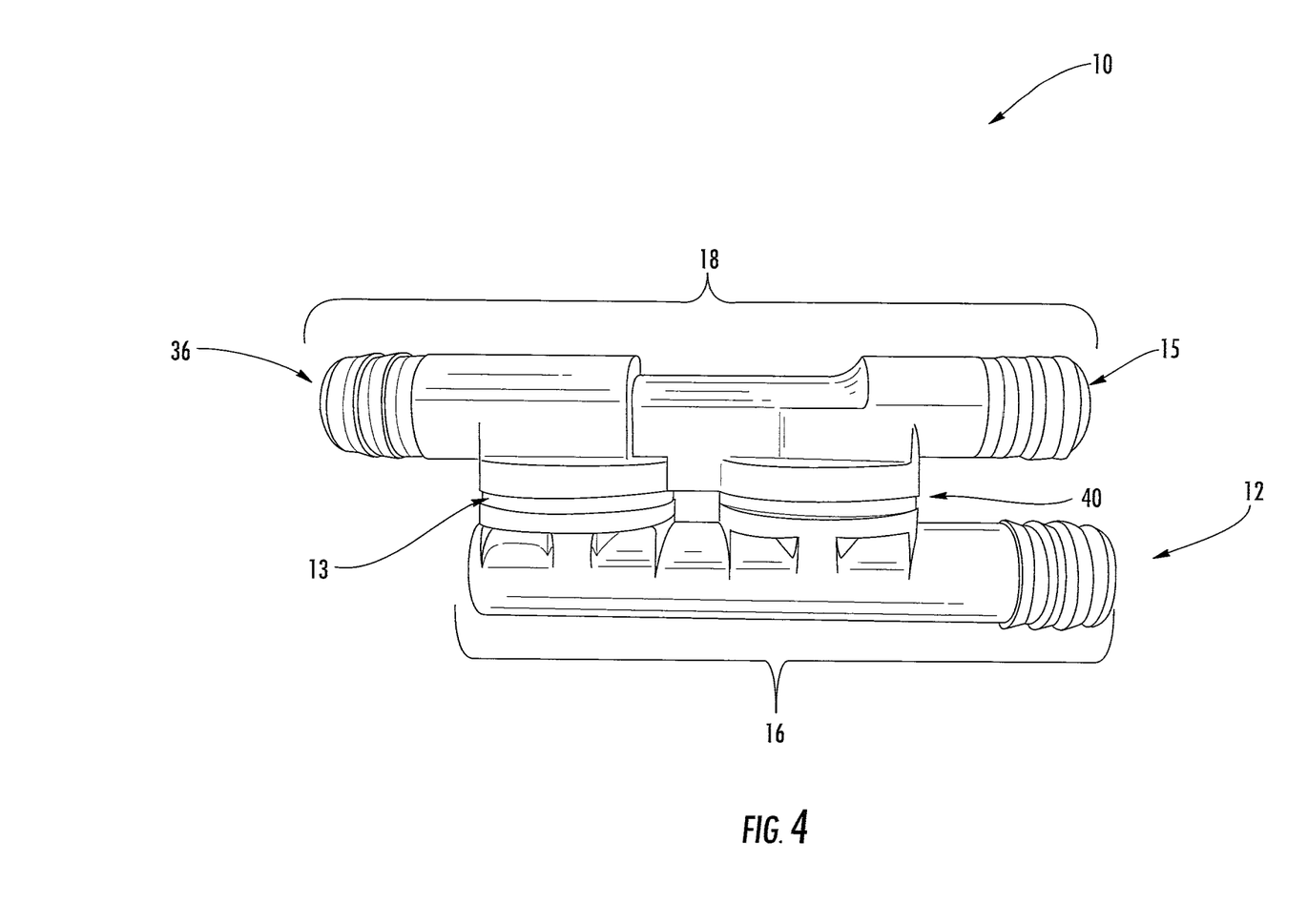
FIG. 4 illustrates a front view of a check valve aspirator formed in accordance with an embodiment.

As illustrated in FIG. 4, an aspirator 10 includes a vacuum channel 16 and an outside air channel 18. The vacuum channel 16 extends between an inlet 12 and a bypass channel 13, and the outside air channel 18 extends between an inlet port 15 and an outlet port 36. The bypass channel 13 fluidly couples the vacuum channel 16 and the outlet port 36. The bypass channel 13 includes a bypass bowl 42 (shown in FIG. 5) having bypass check valve (not shown) positioned therein to control a flow of fluid through the bypass channel 13. The vacuum channel 16 and the outside air channel 18 are further fluidly coupled by a venturi channel 40. The venturi channel 40 includes a venturi bowl 46 (shown in FIG. 5) having venturi check valve (not shown) positioned therein to control a flow of fluid through the venturi channel 40.

Figure 5:
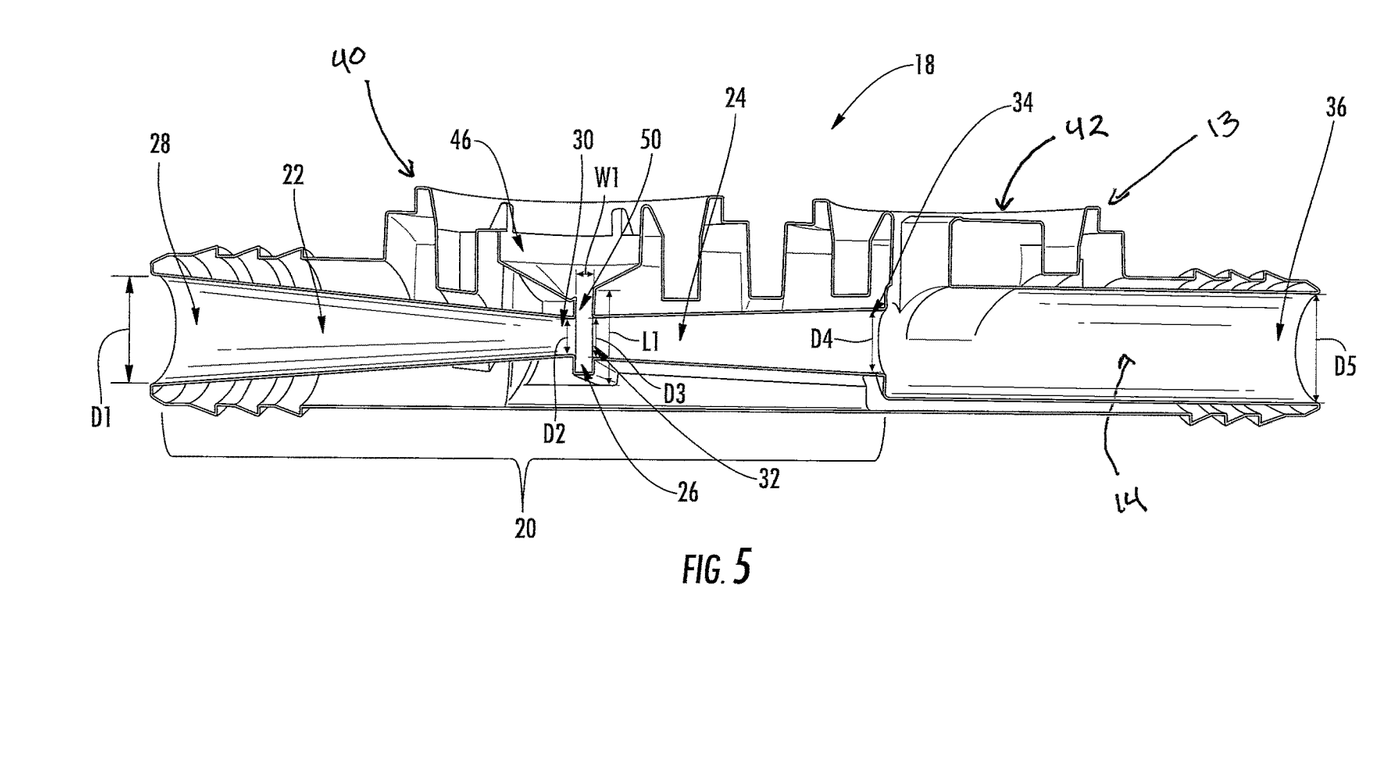
FIG. 5 illustrates a cross-sectional view of the outside flow channel illustrated in FIG. 6.

As illustrated in FIG. 5, a venturi pipe 20 is located in the outside air channel 18. The venturi pipe 20 includes converging section 22 and a diverging section 24. A throat 26 connects the converging section 22 and the diverging section 24. The converging section 22 extends between a converging inlet 28 and a converging outlet 30. The converging section 22 narrows from the converging inlet 28 to the converging outlet 30. In particular, the converging inlet 28 has a diameter $D_1$ that is greater than a diameter $D_2$ of the converging outlet 30. The diverging section 24 includes and diverging inlet 32 and a diverging outlet 34. The diverging section 24 widens from the diverging inlet 32 to the diverging outlet 34. In particular, the diverging inlet 32 has a diameter $D_3$ that is less than a diameter $D_4$ of the diverging outlet 34. The throat 26 extends between the converging outlet 30 and the diverging inlet 32. An outlet channel 14 extends from the diverging outlet 34 to the outlet port 36. The outlet port 36 has a diameter $D_5$ that is greater than each of the diameters $D_1$, $D_2$, $D_3$, and $D_4$.

The venturi bowl 46 discharges air into the venturi pipe 20 through a slot 50 having a width $W_1$ and a length $L_1$. In particular, the slot 50 discharges air into the throat 26 of the venturi pipe 20 when the venturi check valve in the venturi channel 40 is opened and the bypass check valve in the bypass channel 13 is closed. The bypass bowl 42 discharges air into the outside outlet 14. In particular, the bypass bowl 42 discharges air into the outlet channel 14 when the venturi check valve in the venturi channel 40 is closed and the bypass check valve in the bypass channel 13 is opened.

The aspirator 10 differs from the prior art device in several respects. In an exemplary embodiment, flow improvements are the result of a ratio of the various diameters. For example, in one embodiment, the converging inlet 28 at the inlet port 15 and the outlet port 36 for connecting to the external system are each 0.50 inch (12.7 mm) in diameter, while the minimum diameter of the venturi pipe 20 is 0.160" (4 mm). Optionally, a ratio of the diameter $D_1$ of the converging inlet 28 and the diameter $D_5$ of the outlet port 36 may be within a range of 0.5 to 1. In one embodiment, the ratio of the diameter $D_1$ of the converging inlet 28 and the diameter $D_5$ of the outlet port 36 is less than 1. Additionally, other dimensions of the aspirator 10 function to control a flow of air therethrough. In particular, motive flow through the aspirator 10 is a function of the diameters $D_1$ and $D_2$. In an exemplary embodiment, the ratio of diameter $D_1$ to diameter $D_2$ is less than 3.5. In one embodiment, the ratio of diameter $D_1$ to diameter $D_2$ is within a range of 1 to 3.2. Suction flow through the aspirator 10 is determined by the slot width $W_1$ and the diameters $D_3$ and $D_4$. In an exemplary embodiment, the ratio of $D_3$ to $D_4$ is less than 0.95. Optionally, the ratio of $D_3$ to $D_4$ is within a range of 0.5 to 0.9. The slot width $W_1$ may be within a range of 1mm to 3.5 mm and a length $L_1$ of the slot may be within a range of 3 mm to 6 mm. In one embodiment, the slot width $W_1$ and the slot length $L_1$ are defined as a function of a suction flow diameter within the range of 5 to 13 mm. In another embodiment, the suction flow angle is within a range of 4 degrees to 6 degrees. A mixed flow rate in the outlet channel 14 is a function of the combination of the motive flow rate and the suction flow rate, as well as the diameter $D_5$ of the outlet port 36. Additionally, a ratio of diameter $D_2$ to $D_3$ is at least 0.8 in one embodiment. If this ratio is decreased, the slope of the suction curve decreases causing less suction flow and more motive flow. Moreover, a ratio of $D_2$ to $D_5$ is less than 0.4. In one embodiment, this ratio is within a range of 0.3 and 0.35. As this ratio increases, the mixed flow decreases resulting in less flow improvement.

In one embodiment, a bell mouth inlet (not shown) may be used at the converging inlet 28 to transition smoothly from the external device to the venturi pipe 20 as opposed to a conical transition. This allows for smooth airflow through the device while minimizing the length of the transition between the diameters, which keeps the package size from becoming too large when using the larger size venturi diameter.

Figure 7A:
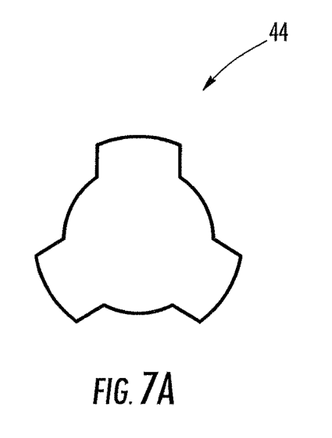
FIG. 7A illustrates a top view of a check valve diaphragm in accordance with an embodiment.
Figure 7B:
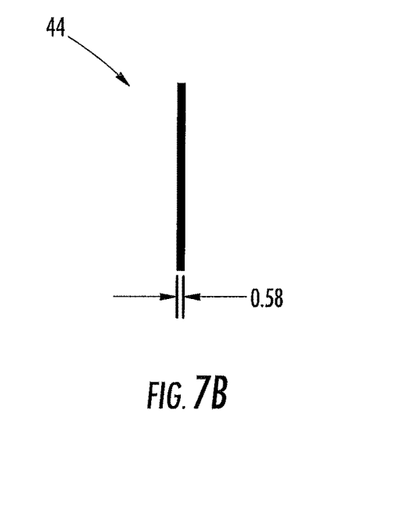
FIG. 7B illustrates a side view of the check valve diaphragm shown in FIG. 7A.

In one embodiment, the check valves allow the aspirator 10 to function in two modes, bypass and venturi. The check valves work independently of each other, providing bypass flow initially until the source vacuum and boost vacuum are the same. Then, the venturi takes over and begins to generate additional vacuum when the bypass function is checked. The bypass bowl 42 is supported by ribs (not shown) to prevent the diaphragm 44 from being pulled through. The diaphragm 44 may also have scallops 60, as illustrated in FIG. 7 and alternatively described in U.S. Patent Application Publication 2011/0186151 filed Feb. 4, 2010, which is herein incorporated by reference in its entirety. The scallops allow additional air-flow through the bypass bowl 42.

The bypass check valve in bypass channel 13 is positioned at least 20 mm from the diverging inlet 32 or within the range of 20 to 45 mm from the diverging inlet 32 to prevent a pressure interference with the function of the venturi pipe 20, so that a percent velocity loss is no greater than 45% at sub-sonic speeds.

During operation, in a bypass mode, air flows through the vacuum channel 16 through inlet 12 and into the bypass channel 13. The bypass check valve in bypass channel 13 is open in the bypass mode to allow the air to flow into the outlet channel 14 where it is discharged through the outlet port 36. During a venturi mode, the air flows through the vacuum channel 16 and into the venturi channel 40. The venturi check valve in venturi channel 40 is open in the venturi mode to allow air to flow through the slot 50 and into the throat 26 as suction flow. The suction flow is mixed with motive flow channeling through the converging section 22 of the aspirator pipe 20. The mixed flow is channeled into the diverging section 24 of the aspirator pipe 20 and into the outlet channel 14 where it is discharged through the outlet port 36.

Figure 6:
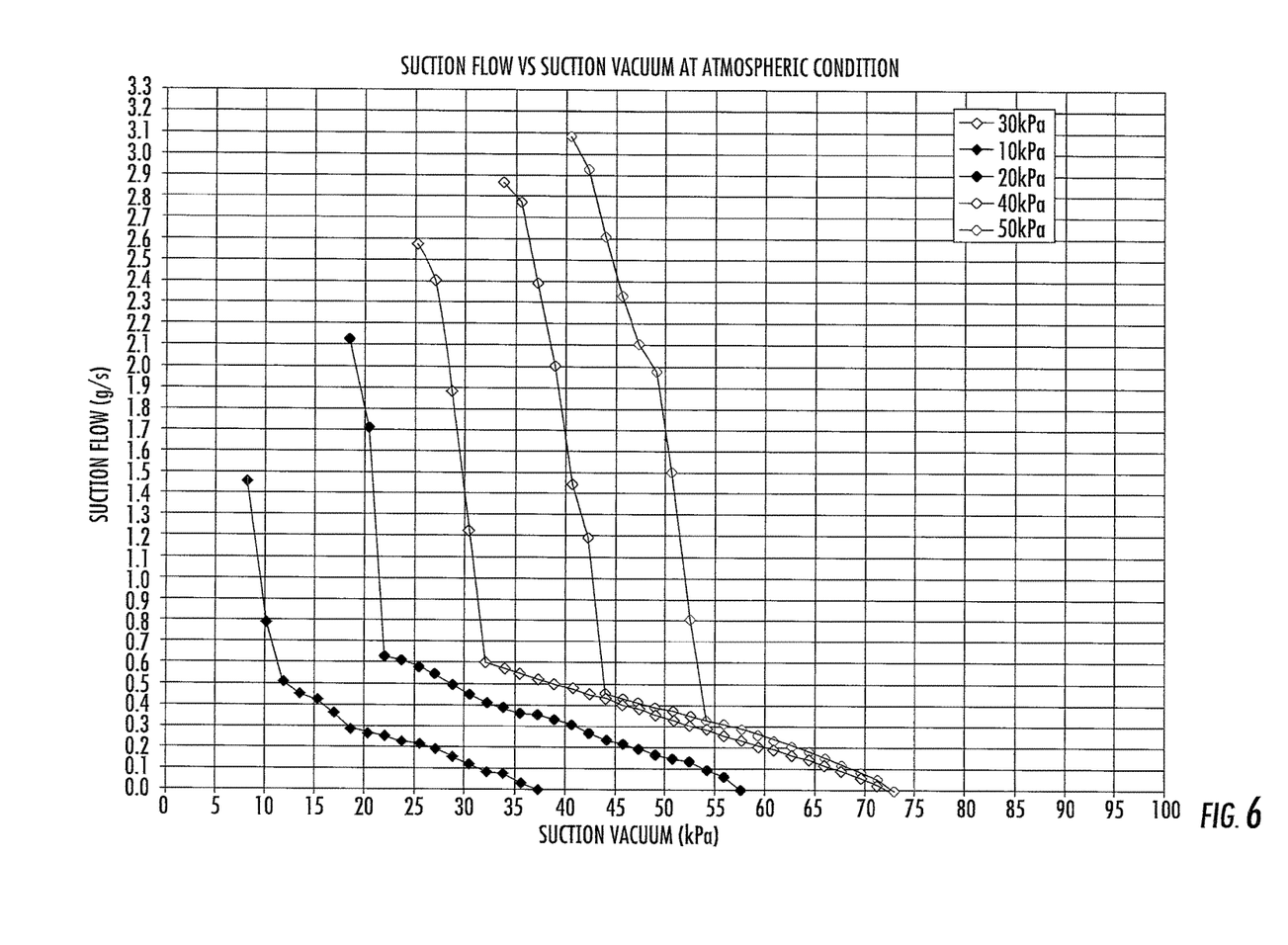
FIG. 6 illustrates test data showing flow through a secondary port versus vacuum at the secondary port when using a check valve aspirator as described in the present embodiments.

As can be seen in FIG. 6, with a 20 kPa vacuum source, the flow rate through the outlet port 36 is more than 0.6 g/s. This provides a better than 1:1 rate of improvement in flow rate with increase in venturi opening size. FIG. 6 includes data for a device that includes the check valve to the left of the venturi. This valve is open when the engine is producing more vacuum than the venturi, thus bypassing the venturi. The operation of the device when this check valve is open accounts for the "semi-vertical" portion of the curves in FIG. 6. With a 20 kPa source and a suction flow less than 20 kPa, a greater than 2.1 g/s mass flow shown in FIG. 6 translates into 3.4 seconds minimum to evacuate a 6L brake booster attached to the first embodiment device.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A check valve aspirator comprising:
   a venturi pipe having a converging section including a converging wall extending from a converging inlet and terminating at a converging outlet, and a diverging section including a diverging wall starting at a diverging inlet and terminating at a diverging outlet, the converging outlet in fluid communication with the diverging inlet;
   a throat disposed between the converging section and the diverging section such that the converging wall is circumferentially spaced apart from the diverging wall where the converging wall terminates at the converging outlet and the diverging wall starts at the diverging inlet, wherein a diameter of the throat is greater than a diameter of the converging outlet and a diameter of the diverging inlet; and
   a venturi check valve bowl in fluid communication with the throat;
   wherein a ratio of the diameter of the converging outlet to the diameter of the diverging inlet is at least 0.8.

2. A check valve aspirator comprising:
   a venturi pipe having a converging section including a converging wall extending from a converging inlet and terminating at a converging outlet, and a diverging section including a diverging wall starting at a diverging inlet and terminating at a diverging outlet, the converging outlet in fluid communication with the diverging inlet;
   a throat disposed between the converging section and the diverging section such that the converging wall is circumferentially spaced apart from the diverging wall where the converging wall terminates at the converging outlet and the diverging wall starts at the diverging inlet, wherein a diameter of the throat is greater than a diameter of the converging outlet and a diameter of the diverging inlet; and
   a venturi check valve bowl in fluid communication with the throat;
   wherein a ratio of a diameter of the converging inlet to the diameter of the converging outlet is less than 3.5.

3. The check valve aspirator of claim 2 wherein the ratio of the diameter of the converging inlet to the diameter of the converging outlet is within a range of 1 to 3.2.

4. A check valve aspirator comprising:
   a venturi pipe having a converging section including a converging wall extending from a converging inlet and terminating at a converging outlet, and a diverging section including a diverging wall starting at a diverging inlet and terminating at a diverging outlet, the converging outlet in fluid communication with the diverging inlet;
   a throat disposed between the converging section and the diverging section such that the converging wall is circumferentially spaced apart from the diverging wall where the converging wall terminates at the converging outlet and the diverging wall starts at the diverging inlet, wherein a diameter of the throat is greater than a diameter of the converging outlet and a diameter of the diverging inlet; and
   a venturi check valve bowl in fluid communication with the throat;
   wherein a ratio of the diameter of the diverging inlet to a diameter of the diverging outlet is within a range of 0.5 to 0.9.

5. A check valve aspirator comprising:
   a venturi pipe having a converging section including a converging wall extending from a converging inlet and terminating at a converging outlet, and a diverging section including a diverging wall starting at a diverging inlet and terminating at a diverging outlet, the converging outlet in fluid communication with the diverging inlet;
   a throat disposed between the converging section and the diverging section such that the converging wall is circumferentially spaced apart from the diverging wall where the converging wall terminates at the converging outlet and the diverging wall starts at the diverging inlet, wherein a diameter of the throat is greater than a diameter of the converging outlet and a diameter of the diverging inlet; and
   a venturi check valve bowl in fluid communication with the throat;
   wherein the venturi check valve bowl is in fluid communication with the throat through a slot, wherein the slot has a width within a range of 1 mm to 3.5 mm and a length within a range of 3 mm to 6 mm.

6. An internal combustion engine comprising:
   an air flow conduit to provide vacuum assist for a subsystem; and
   a check valve aspirator in fluid communication with the flow conduit, the check valve aspirator further comprising:
   a venturi pipe having a converging section including a converging wall extending from a converging inlet and terminating at a converging outlet, and a diverging section including a diverging wall starting at a diverging inlet and terminating at a diverging outlet, the converging outlet in fluid communication with the diverging inlet;
   a throat disposed between the converging section and the diverging section such that the converging wall is circumferentially spaced apart from the diverging wall where the converging wall terminates at the converging outlet and the diverging wall starts at the diverging inlet, wherein a diameter of the throat is greater than a diameter of the converging outlet and a diameter of the diverging inlet; and
   a venturi check valve bowl in fluid communication with the throat;
   wherein a ratio of the diameter of the converging outlet to a diameter of the diverging section inlet is at least 0.8.

7. An internal combustion engine comprising:
   an air flow conduit to provide vacuum assist for a subsystem; and a check valve aspirator in fluid communication with the flow conduit, the check valve aspirator further comprising:
a venturi pipe having a converging section including a converging wall extending from a converging inlet and terminating at a converging outlet, and a diverging section including a diverging wall starting at a diverging inlet and terminating at a diverging outlet, the converging outlet in fluid communication with the diverging inlet;
a throat disposed between the converging section and the diverging section such that the converging wall is circumferentially spaced apart from the diverging wall where the converging wall terminates at the converging outlet and the diverging wall starts at the diverging inlet, wherein a diameter of the throat is greater than a diameter of the converging outlet and a diameter of the diverging inlet; and
a venturi check valve bowl in fluid communication with the throat;
wherein a ratio of a diameter of the converging inlet to the diameter of the converging outlet is less than 3.5.

8. The internal combustion engine of claim 7 wherein the ratio of the diameter of the converging inlet to the diameter of the converging outlet is within a range of 1 to 3.2.

9. An internal combustion engine comprising:
an air flow conduit to provide vacuum assist for a subsystem; and
a check valve aspirator in fluid communication with the flow conduit, the check valve aspirator further comprising:
a venturi pipe having a converging section including a converging wall extending from a converging inlet and terminating at a converging outlet, and a diverging section including a diverging wall starting at a diverging inlet and terminating at a diverging outlet, the converging outlet in fluid communication with the diverging inlet;
a throat disposed between the converging section and the diverging section such that the converging wall is circumferentially spaced apart from the diverging wall where the converging wall terminates at the converging outlet and the diverging wall starts at the diverging inlet, wherein a diameter of the throat is greater than a diameter of the converging outlet and a diameter of the diverging inlet; and
a venturi check valve bowl in fluid communication with the throat;
wherein a ratio of a diameter of the diverging inlet to a diameter of the diverging outlet is within a range of 0.5 to 0.9.

10. An internal combustion engine comprising:
an air flow conduit to provide vacuum assist for a subsystem; and
a check valve aspirator in fluid communication with the flow conduit, the check valve aspirator further comprising:
a venturi pipe having a converging section including a converging wall extending from a converging inlet and terminating at a converging outlet, and a diverging section including a diverging wall starting at a diverging inlet and terminating at a diverging outlet, the converging outlet in fluid communication with the diverging inlet;
a throat disposed between the converging section and the diverging section such that the converging wall is circumferentially spaced apart from the diverging wall where the converging wall terminates at the converging outlet and the diverging wall starts at the diverging inlet, wherein a diameter of the throat is greater than a diameter of the converging outlet and a diameter of the diverging inlet; and
a venturi check valve bowl in fluid communication with the throat;
wherein the venturi check valve bowl is in fluid communication with the throat through a slot, wherein the slot has a width within a range of 1 mm to 3.5 mm and a length within a range of 3 mm to 6 mm.

11. A check valve aspirator comprising:
a venturi pipe having a converging section including a converging wall extending from a converging inlet and terminating at a converging outlet, and a diverging section including a diverging wall starting at a diverging inlet and terminating at a diverging outlet, the converging outlet in fluid communication with the diverging inlet;
a throat disposed between the converging section and the diverging section such that the converging wall is circumferentially spaced apart from the diverging wall where the converging wall terminates at the converging outlet and the diverging wall starts at the diverging inlet, wherein a diameter of the throat is greater than a diameter of the converging outlet and a diameter of the diverging inlet;
a venturi check valve bowl in fluid communication with the throat; and
an outlet channel in fluid communication with the venturi pipe and having an outlet port, wherein a ratio of a diameter of the converging outlet to a diameter of the outlet port is less than 0.4.

12. The check valve aspirator of claim 11, wherein the ratio of the diameter of the converging outlet to the diameter of the outlet port is within a range of 0.3 to 0.35.

13. The check valve aspirator of claim 11 further comprising a bypass check valve bowl in fluid communication with the outlet channel, wherein the bypass check valve bowl is positioned at least 20 mm downstream of the diverging outlet.

14. The check valve aspirator of claim 13, wherein the bypass check valve bowl is positioned within a range of 20 mm to 45 mm downstream of the diverging outlet.

15. The check valve aspirator of claim 13 further comprising a check valve positioned within the bypass check valve bowl, the check valve having a scalloped diaphragm.

16. An internal combustion engine comprising:
an air flow conduit to provide vacuum assist for a subsystem; and
a check valve aspirator in fluid communication with the flow conduit, the check valve aspirator further comprising:
a venturi pipe having a converging section including a converging wall extending from a converging inlet and terminating at a converging outlet, and a diverging section including a diverging wall starting at a diverging inlet and terminating at a diverging outlet, the converging outlet in fluid communication with the diverging inlet;
a throat disposed between the converging section and the diverging section such that the converging wall is circumferentially spaced apart from the diverging wall where the converging wall terminates at the converging outlet and the diverging wall starts at the diverging inlet, wherein a diameter of the throat is greater than a diameter of the converging outlet and a diameter of the diverging inlet;

a venturi check valve bowl in fluid communication with the throat; and an outlet channel in fluid communication with the venturi pipe and having an outlet port, wherein a ratio of a diameter of the converging outlet to a diameter of the outlet port is less than 0.4.

17. The internal combustion engine of claim 16, wherein the ratio of the diameter of the converging outlet to the diameter of the outlet port is within a range of 0.3 to 0.35.

18. The internal combustion engine of claim 16 further comprising a bypass check valve bowl in fluid communication with the outlet channel, wherein the bypass check valve bowl is positioned at least 20 mm downstream of the diverging outlet.

19. The internal combustion engine of claim 18, wherein the bypass check valve bowl is positioned within a range of 20 mm to 45 mm downstream of the diverging outlet.

20. The internal combustion engine of claim 18 further comprising a check valve positioned within the check valve bowl, the check valve having a scalloped diaphragm.

* * * * *